United States Patent
Tsujikawa et al.

(10) Patent No.: US 8,124,000 B2
(45) Date of Patent: Feb. 28, 2012

(54) SUBSTRATE MANUFACTURING METHOD INCLUDING PROTRUSION REMOVING STEP

(75) Inventors: Susumu Tsujikawa, Tokyo (JP); Yoshio Otani, Tokyo (JP); Tetsumi Sumiyoshi, Tokyo (JP)

(73) Assignee: Cyber Laser Inc., Tokyo (JP)

( * ) Notice: Subject to any disclaimer, the term of this patent is extended or adjusted under 35 U.S.C. 154(b) by 934 days.

(21) Appl. No.: 11/997,607

(22) PCT Filed: Jul. 27, 2006

(86) PCT No.: PCT/JP2006/314829
§ 371 (c)(1),
(2), (4) Date: Feb. 1, 2008

(87) PCT Pub. No.: WO2007/018038
PCT Pub. Date: Feb. 15, 2007

(65) Prior Publication Data
US 2010/0219542 A1    Sep. 2, 2010

(30) Foreign Application Priority Data
Aug. 5, 2005   (JP) .................. 2005-228948

(51) Int. Cl.
B23K 26/36   (2006.01)
B29D 11/00   (2006.01)

(52) U.S. Cl. .............. 264/400; 219/121.68; 219/121.69; 264/1.37; 264/2.7

(58) Field of Classification Search .................... 264/1.1, 264/1.37, 2.7, 400, 482; 425/174.4; 219/121.68, 219/121.69, 121.78
See application file for complete search history.

(56) References Cited

U.S. PATENT DOCUMENTS

| | | |
|---|---|---|
| 2003/0213770 A1 | 11/2003 | Yamada et al. |
| 2005/0056625 A1 | 3/2005 | Haight et al. |
| 2005/0244622 A1 | 11/2005 | Yamada et al. |
| 2005/0255716 A1 * | 11/2005 | Tanaka et al. ............... 438/795 |

FOREIGN PATENT DOCUMENTS

| | | |
|---|---|---|
| JP | 2000-305086 | 11/2000 |
| JP | 2003-57428 | 2/2003 |
| JP | 2003-233064 | 8/2003 |
| JP | 2003-245784 | 9/2003 |
| JP | 2003-279722 | 10/2003 |
| JP | 2004-325837 | 11/2004 |
| JP | 2005-017486 | 1/2005 |
| JP | 2005-107318 | 4/2005 |

OTHER PUBLICATIONS

International Search Report by ISA Japanese Patent Office, Sep. 28, 2006.
Chinese Office action for CN200680028846X.

* cited by examiner

*Primary Examiner* — Mathieu D. Vargot
(74) *Attorney, Agent, or Firm* — Pearne & Gordon LLP

(57) ABSTRACT

A method for removing and modifying a protrusion by using a short pulse laser is provided for modifying a color filter. In a color filter modifying method, a transparent substrate (2) is scanned with a beam in a parallel direction, while irradiating a protrusion (8) generated on the color filters (3-1, 3-2, 3-3) formed on a transparent substrate (2) with a beam collected by a high NA condensing lens (18), and a protrusion (8) is removed or modified.

12 Claims, 3 Drawing Sheets

SUBSTRATE MANUFACTURING METHOD INCLUDING PROTRUSION REMOVING STEP

TECHNICAL FIELD

The present invention relates to a method of manufacturing substrates having flat surfaces using a laser beam, and further relates to a method of modifying protrusions produced during the manufacture of color filters for display devices displaying color images through color filters such as liquid crystal display devices (LCD) and a method for manufacturing color filter substrates having flat surfaces using the aforementioned method.

BACKGROUND ART

FIG. 1 shows the typical structure of a portion of a liquid crystal display device. The basic structural elements of a liquid crystal cell 1 for use in a liquid crystal display device are a back light (not shown) provided on the back side of the display panel, a TFT substrate 220, a color filter substrate 100, and a liquid crystal 210 sandwiched between the TFT substrate 220 and the color filter substrate 100. The TFT substrate 220 comprises a transparent glass substrate 5, a polarizer (not shown), a transistor 6 for controlling pixels formed on the transparent glass substrate 5, gate scan lines 7-1, storage capacitor lines 7-2 and a transparent electrode having an orientation film on the uppermost layer. On the other hand, the basic structural elements of the color filter substrate 100 are a transparent substrate 2, a color filter 3 and a common electrode formed on the transparent substrate 2. Cylindrical spacers 4-2 are formed at non-transparent portions where the black matrices of the color filter substrate are positioned between the color filter substrate 100 and the TFT substrate 220 in order to make the thickness of the space for the liquid crystal uniform throughout the screen.

The light from the back light is linearly polarized by a polarizing plate (not shown) provided on the TFT substrate, the polarization properties are controlled (i.e., the polarization is changed or remains unchanged) during passage through the liquid crystal 210), and the light is blocked or transmitted by the polarizing plate provided on the color filter substrate 100.

Liquid crystal display devices having such a structure are described in JP2003-233064A, JP2000-305086A and so on. FIG. 2 schematically shows the typical structural elements of the color filter substrate in a liquid crystal display device. The display screen is composed of a plurality of pixels each having color filters for red (R) 3-1, blue (B) 3-2 and green (G) 3-3. The spacers 4-2 are formed on the black matrices 4-1 by exposure of a photosensitive resin and an etching process. Additionally, the spacers 4-2 have a height of approximately 4 μm, and are formed to the same height so as to prevent any unevenness in the color where the liquid crystal is filled.

During the process of manufacturing color filter substrates, they are coated with color ink to a thickness of 1-3 μm. However, during the process of laying ink on the pixels of the color filters, protrusions 8 can be formed on the filter pixel portions, depending on the physical parameters such as the viscosity and rate of setting of the color ink. These are protruding defects, having a height 10 of approximately 10 μm and a cylinder diameter of 20-100 μm.

When these protruding defects occur, the distance between the color filter substrate and the TFT substrate positioned opposite thereto may be determined by the height 10 of the protrusions 8 which are defects, instead of the height 9 of the spacers 4-2. As a result, the thickness of the space for the liquid crystal can differ depending on the position, causing the colors to be uneven and making the liquid crystal display cells defective.

According to publicly known art, when protrusions are formed on color filters, protruding defects identified by inspection are irradiated with a pulse laser to remove the entire protrusions, including dust and color ink forming the protrusions, down to the transparent substrate, recesses are formed in the surrounding color filters, then these orifices are filled with correcting ink using a dispenser, to thereby correct defects due to contaminant protrusions (Patent Document 3). A method involving removal of contaminants on the color filter using a UV laser, coating with a black resist at positions where there is color loss, and setting by UV irradiation.

Patent Document 1: JP2003-233064A
Patent Document 2: JP2000-305086A
Patent Document 3: JP2003-279722A
Patent Document 4: JP2003-57428A

DISCLOSURE OF THE INVENTION

Problems to be Solved by the Invention

All of the conventional methods mentioned above involve removal down to the transparent substrate of the color filter, followed by filling with color or black ink, then setting, and therefore have the drawback of requiring at least two steps of removal and filling.

Means for Solving the Problems

The present invention solves the above-described problems by offering a method of manufacturing substrates having flat surfaces including removal of protrusion portions protruding from the substrate surface, comprising a step of directing a short processing focal depth convergent beam onto a protrusion using a high-NA condenser lens to apply adequate fluence to remove said protrusion while simultaneously applying said fluence or less at positions on the substrate surface to remove the protrusion.

The work efficiency can be improved by scanning the beam parallel to the substrate surface. The short focal depth convergent beam is preferably a harmonic of a fundamental wave such as a second harmonic, third harmonic or a fourth harmonic.

Furthermore, the beam waist should be positioned at the substrate surface or in the vicinity of the substrate surface. Additionally, the present invention can be efficiently worked by detecting the planar shape of the protrusion, and upon detecting said planar shape, scanning only in a certain range including said planar shape. At that time, it is possible to scan an image of an aperture or focused beam.

Furthermore, it is not always necessary to remove the protrusions in their entirety, and it is possible to remove just a portion of the top layer of the protrusions. The wavelength of the laser used in this case is preferably about 560-390 nm, and more preferably 390 nm or less. This is because the material of the color filter forming the protrusions is mainly composed of resin, which has relatively high absorption in the visible to ultraviolet region, so that just a portion of the surface layer onto which the laser is directed can be easily removed. Additionally, the pulse width of the laser is preferably $1 \times 10^{-12}$ seconds or less. Furthermore, if the substrate is a color filter substrate, then it is possible to obtain a color filter in which protrusions formed from ink are appropriately removed.

The present invention further solves the above-described problems by offering a color filter protrusion modifying method in a process of manufacturing a color filter substrate, comprising removing a protrusion portion higher than a spacer by relatively scanning a short processing focal depth convergent beam formed by a high-NA condenser lens in a direction parallel to the substrate surface to remove the protrusion portion Additionally, the present invention solves the above-described problems by offering a color filter protrusion modifying device, comprising laser beam generating means, a condenser lens to convert a laser beam generated by said laser beam generating means into a convergent beam, and relative movement means for relatively scanning said convergent beam in a parallel direction onto the surface of the color filter substrate which is the object of processing, for removing protrusions higher than spacers of said color filter substrate by subjecting to said convergent beam while relatively scanning said convergent beam. As the relative movement means for the convergent beam, it is possible to use a stage, or a galvanomirror optical system.

According to the present invention, after forming protrusions in a color filter manufacturing process, the positions of the protrusions can be measured in an inspection step, and the protrusions can be processed to a predetermined height by removal with a short focal depth convergent laser beam. In order to cut the protrusions at a predetermined height, short pluses of picoseconds or less and short pulses in the infrared range are wavelength-converted into UV lasers, these UV short pulses are converged by a high-NA condenser lens to achieve a laser power density distribution in the direction of the optical axis such that the processing focal depth formed by the convergent spot is shorter than the height of the protrusion, and this convergent spot is scanned parallel to the surface of the color filter substrate to remove protrusions within the processing focus to modify the desired protrusions. The modification process can be simplified by removing protruding defects on a color filter substrate over a predetermined height while leaving the predetermined height.

EFFECTS OF THE INVENTION

As effects of the present invention, for example, when considering a color filter, the tip portions of protrusions higher than the spacers, which can cause defects, can be easily removed simply by shining a laser beam on the protruding defects generated in the process of manufacture, thus improving the product yield and reducing product cost. Furthermore, while conventional methods for correcting protrusions using lasers involve complete removal of protrusions down to the substrate and therefore must be followed by a separate step of correction by filling the removed portions with color ink, the present invention has the advantage of enabling the correction to be completed simply by removing the protrusions.

Furthermore, the removal is performed using short pulses of high power density, so the removed material can be finely vaporized and scattered, and can be easily drawn away in gaseous form by installing a suction nozzle near the protrusions being processed.

Figure 1:
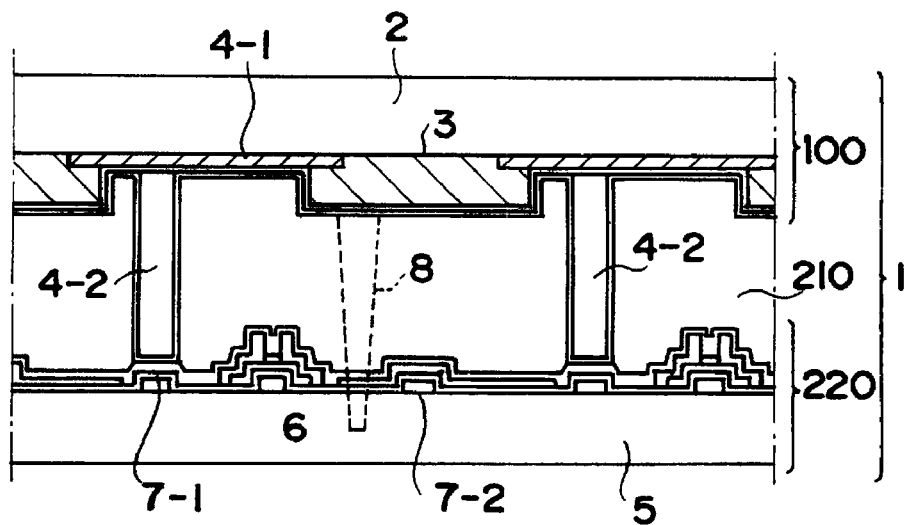
FIG. 1 is a schematic section view of a color filter substrate, a TFT substrate and a space for filling with liquid crystal.

1: liquid crystal cell for liquid crystal display device
2: transparent substrate for color filter
3: 3-1, 3-2, 3-3 color filters
4-1: black matrix
4-2: spacer
5: transparent glass substrate
6: transistor for controlling pixels
7-1: gate scan line
7-2: storage capacitor line
8, 23: protrusion
8-1: removed protrusion
8-2: remaining protrusion
9: spacer height
10: protrusion height
14, 27: cut surface
16: beam waist
17, 19: beam
18: high NA condenser lens
20, 21: beam direction
22: beam waist position
24: XY stage
25: stage platform
26: path
27: cut surface
28: step
29: protrusion tip
30: test protrusion
100: color filter substrate
220: TFT substrate
210: liquid crystal

BEST MODES FOR CARRYING OUT THE INVENTION

Figure 2:
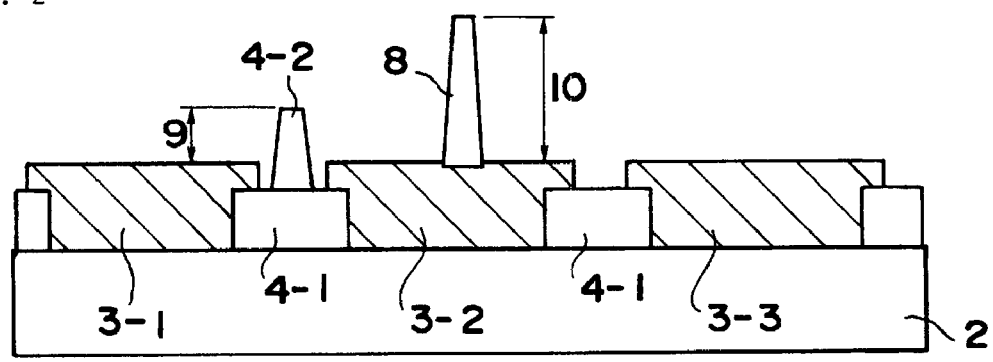
FIG. 2 is a schematic section view of a color filter substrate having a protrusion and a spacer.

Herebelow, the present invention shall be described with reference to the drawings. The typical structural elements of a color filter substrate as shown in FIG. 2 are the object of processing of the present invention. While a transparent electrode, not shown, is normally formed on the color filter and an orientation film is further formed thereon, these are not illustrated here because they are not related to the processing method of the present invention. In FIG. 2, a non-transparent black matrix portion 4-1 is formed by patterning of a chrome deposition film on the transparent substrate 2 forming the color filter, and red, green and blue color filters 3-1, 3-2 and 3-3 are provided in window portions which transmit light. In the portions of the black matrix 4-1 which do not transmit light are provided spacers 4-2 defining the spatial distance between the color filter substrate 100 and the TFT substrate 220. The height 9 is about 4 µm.

On the other hand, the protrusions 8 which are formed during the color filter manufacturing process to which the modifying method of the present invention is applied can have a height 10 from about 10 µm to as much as 100 µm. If a liquid crystal substrate cell is assembled with the protrusions left at such a height, the thickness of the space to be filled with the liquid crystal 210 will differ depending on the location. This can cause the colors to become uneven on the liquid crystal display substrate, making the display device unusable in practice. Therefore, the height of the protrusions 8 should be held to less than the height 9 of the spacers 4-2.

In order to fulfill this need, laser processing is used in the present invention, and laser cutting usually involves forming a cross section along the axial direction of the laser beam. The present invention enables the processing surface to be formed in a direction perpendicular to the optical axis of the laser beam, by controlling the power density in the spatial axial direction of the laser beam.

In general, the processing focal distance is considered to be equivalent to the optical focal distance, and its range is given by $\lambda/NA^2$, where $\lambda$ is the wavelength of the light and NA is the numerical aperture of the lens. This equation indicates that the processing focal distance is inversely proportional to the square of NA. This means that the processing range in the direction of the optical axis can be limited to a small range by using a lens with a short focal length and large aperture. When using, as the lens, a UV lens for processing which is a condenser lens of NA=0.7 and focal length f=2 mm, in conjunction with a short-pulse laser of wavelength 390 nm generated from a nonlinear optical crystal which doubles the frequency of a short-pulse laser of wavelength 780 nm, then the processing focal distance is 0.9 μm. Therefore, by using a high-NA condenser lens of this caliber, it is possible to control the processing range within about the depth of the processing focal point in the direction of the optical axis. While the degree of flatness of the processing surface will differ depending on the rate of overlap of scanning spots, a rate of about 50% is sufficient in practice when cutting protrusions from a color filter.

Figure 3:
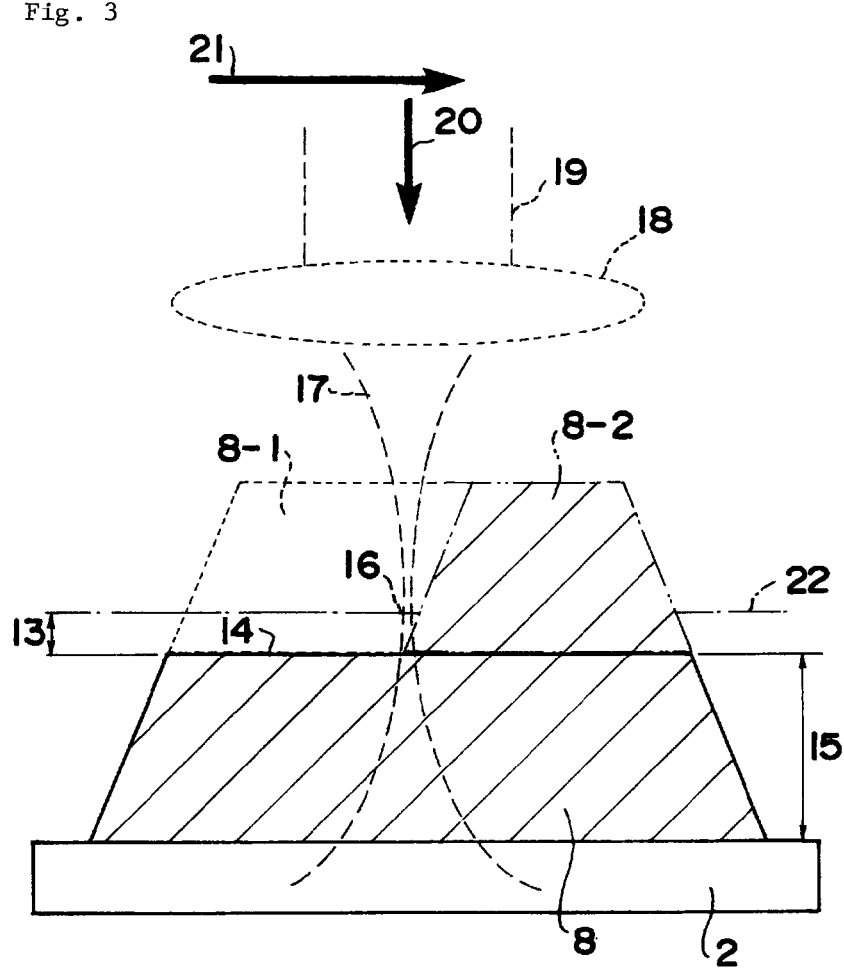
FIG. 3 is a diagram showing the positional relationship at the time of processing between a protrusion and a laser condenser optical system for cutting away the protrusion in an embodiment of the present invention.

FIG. 3 shows the positional relationship between the above-described optical system and a protrusion on a color filter which is the object of processing. Pulses of wavelength 390 nm are formed by converting a femtosecond laser beam of wavelength 1560 nm issued by a mode-synchronized femtosecond laser generator comprising an optical fiber by halving the wavelength with a nonlinear optical crystal, amplifying the short pulses using an amplification gain substance composed of a titanium-doped sapphire crystal, then converting the near-infrared wavelength thereof with a nonlinear optical crystal to obtain a short pulse UV output of wavelength 390 nm. These pulses are made incident as a beam 19 on a high-NA condenser lens 18 from the direction of the arrow 20 in FIG. 3, and the convergent beam issuing from the condenser lens is directed toward the protrusion 8. The convergent beam 17 forms a beam waist 16.

Since the processing focal depth in the vicinity of the beam waist 16 can be made adequately small (1 μm or less) by adjusting the pulse energy of the laser output, the processing focal depth on the far side of the lens 18 in the vicinity of the focal point is set to the distance 15 from the glass substrate 2 as seen in FIG. 3, which is the height to which the color filter protrusions 8 should be limited. The position 22 of the beam waist is set to a level above the position where the color filter is to be cut by about the processing focal depth 13.

Figure 4:
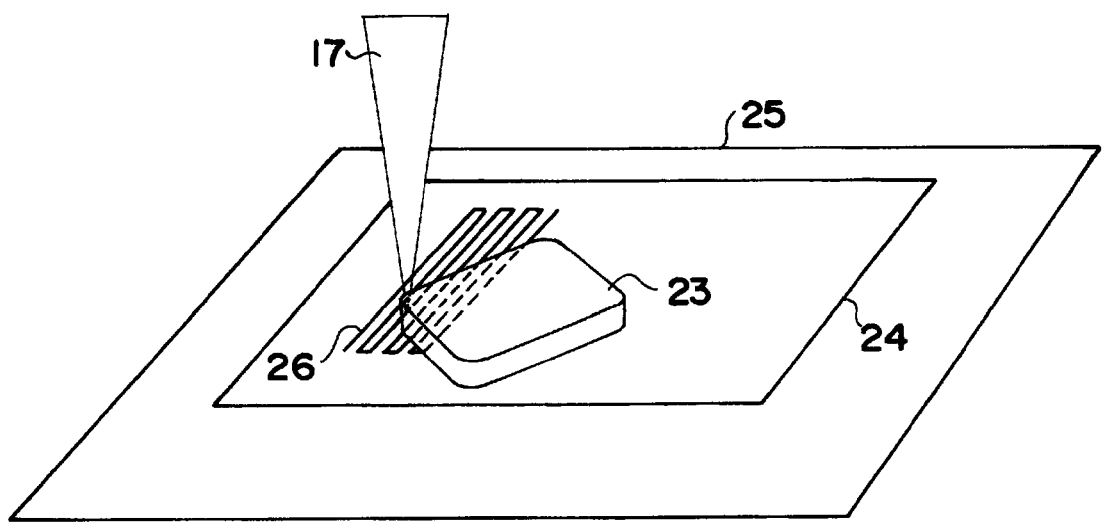
FIG. 4 is a diagram showing how the color filter protrusion is cut by scanning the laser beam along the substrate.

The beam is scanned as shown in FIG. 4 with the optical system arranged in the above way. An XY stage 24 is mounted on a stage platform 25, the protrusion 23 is positioned thereon, and the XY stage 24 is moved to scan in a zigzag pattern 26 on a plane perpendicular to the optical axis of the laser beam. This scanning pattern will have no detrimental effect even if the scan covers areas separate from the protrusion. The protrusion 8 shown in FIG. 3 can be removed by such beam scanning, to the extent that it lies within the processing focal point of the laser beam. In FIG. 3, the removed portion of the protrusion is indicated by the portion 8-1 denoted by defined by dashed lines. As the beam is advanced in the direction 21, the remaining portion 8-2 of the protrusion is removed, as a result of which the protrusion is eliminated down to the cut surface 14.

As an alternative to the method of moving a stage, the beam can be scanned by using a galvanomirror to move the beam in the zigzag pattern shown in FIG. 4.

Figure 5:
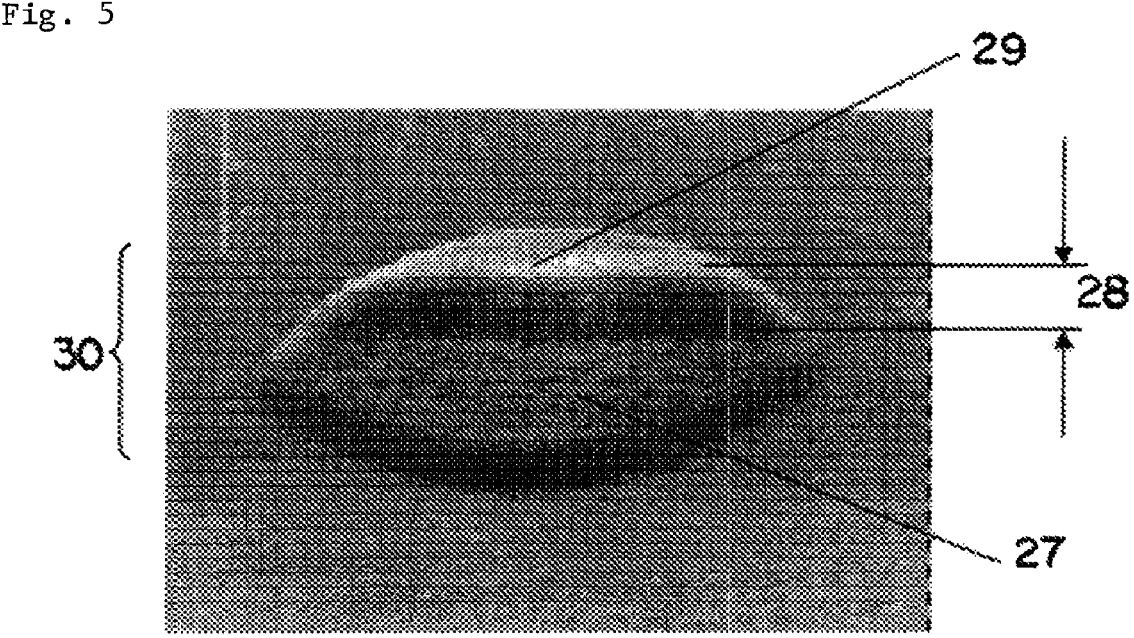
FIG. 5 is a diagram showing how a test protrusion was partially cut by the present invention.

An example of processing shall be described below. As the laser beam, the second harmonic (wavelength 390 nm) of a Ti:Sa (titanium sapphire) laser with a fundamental wave of 780 nm was used, with a pulse repetition rate of 1000 Hz, pulse energy of 5 nJ, a pulse width of 200 fs, and a beam quality $M^2$ of 1.63 in the X direction and 1.62 in the Y direction. The lens had an NA of 0.7 (Mitutoyo M Plan NIR 100×HR). The beam diameter was 1 μm, the scanning speed was 10 μm/s, the scanning pitch was 1 μm and the energy fluence was 0.6 J/cm$^2$. Under these conditions, the top half of a test protrusion 30 formed artificially of the same material as the color filter was cut as shown in FIG. 5 by scanning a beam left to right from the bottom of the photo to cut away about half thereof.

The step 28 between the cut surface 27 and the top 29 of the test protrusion 29 was formed by cutting. The surface roughness of the cut surface changed depending on the rate of overlap between the convergent spots at the time of illumination; at 50%, the roughness was 60 nm. This degree of surface roughness is sufficiently flat for use as a color filter. Since it is sufficient to reduce the height of the protrusion to be lower than the spacers, the processing precision is adequate. In the method of the present invention, a laser beam of narrow pulse width is used, so that the thermal impact at the processing point is small and there is no deformation. Additionally, since the portion subjected to the laser beam is vaporized, it will hardly affect the colorant.

The fundamental wavelength of a titanium sapphire laser is not necessarily 780 nm; the wavelength can be adjusted between about 700 and 900 nm. Therefore, the second harmonic will be about 350 to 450 nm, and the third harmonic will be about 233 to 300 nm. Additionally, it is possible to use the second or third harmonics of a Yb (ytterbium) fiber laser with a fundamental wavelength of about 980 to 1120 nm. As the nonlinear optical crystal for obtaining harmonics, it is possible to use LBO (lithium triborate), BBO (barium borate) or the like.

Furthermore, it is also possible to use the second harmonic (532 nm), third harmonic (355 nm) or fourth harmonic (266 nm) of an Nd:YAG or Nd:YVO$_4$ laser with a fundamental wavelength of 1064 nm. The third harmonic, and in particular, the fourth harmonic, which are in the UV range highly absorbed by the materials are highly effective.

Examples of modes for working the present invention have been described above. However, it should be clear that modifications are possible without departing from the spirit of the invention as claimed.

INDUSTRIAL APPLICABILITY

While the embodiments described above were explained in the context of color filters for liquid crystal display devices, the method can be applied to removal of protrusions in other types of display devices. The method can be used in processes for fixing protruding defects in color filters used for color organic EL displays, which is another method for displaying color aside from liquid crystal. In this case, there is no need for spacers such as in liquid crystal cells, but protrusions can cause defects. By positioning the beam waist in the vicinity of the surface of the color filter and scanning parallel to the color filter substrate, it is possible to cut away protrusions if they protrude from the surface of the color filter. Additionally, the protrusion removal method of the present invention can also be used to remove burrs formed during mechanical processing. That is, the position of a laser beam waist is set onto a body using a high-NA condenser lens to cut away only the protruding portions and leave the body surface undamaged, by taking advantage of a shallow processing focal depth in the direction of the optical axis due to a short processing focal depth to set the power density, thereby enabling only the burr portions to be removed.

The invention claimed is:

1. A method of manufacturing a substrate that has a spacer including removal of protrusion portions protruding from the substrate surface, comprising a step of directing a short processing focal depth convergent beam onto a protrusion using a high-NA condenser lens to apply adequate fluence to remove said protrusion while simultaneously applying said fluence or less at positions on the substrate surface to remove the protrusion, wherein the short processing focal depth convergent beam is set so that the beam waist thereof is positioned in the protrusion, wherein the position of the beam waist is set to a level in the protrusion above a position where the protrusion is to be cut by about the processing focal depth, and wherein the position where the protrusion is to be cut is at a distance from the substrate not greater than the height of the spacer of the substrate.

2. A method of manufacturing a substrate in accordance with claim 1, comprising a step of scanning said beam parallel to the substrate surface.

3. A method of manufacturing a substrate in accordance with claim 1, wherein said beam is a harmonic of a fundamental wave.

4. A method of manufacturing a substrate in accordance with claim 1, wherein said beam is a second harmonic of a fundamental wave.

5. A method of manufacturing a substrate in accordance with claim 1, wherein a planar shape of the protrusion is detected, and only a certain range including said planar shape is scanned.

6. A method of manufacturing a substrate in accordance with claim 1, wherein an image of an aperture or focused beam is scanned.

7. A method of manufacturing a substrate in accordance with claim 1, wherein only a portion of a top layer of the protrusion is removed.

8. A method of manufacturing a substrate in accordance with claim 1, wherein the wavelength of the beam is 560 nm or less.

9. A method of manufacturing a substrate in accordance with claim 1, wherein the wavelength of the beam is 390 nm or less.

10. A method of manufacturing a substrate in accordance with claim 1, wherein the pulse width of the beam is $1 \times 10^{-12}$ second or less.

11. a method of manufacturing a substrate in accordance with claim 1, wherein said substrate is a color filter substrate.

12. A color filter protrusion modifying method in a process of manufacturing a color filter substrate that has a spacer, comprising removing the protrusion portion higher than the spacer by relatively scanning a short processing focal depth convergent beam formed by a high-NA condenser lens in a direction parallel to the substrate surface to remove the protrusion portion, wherein the short processing focal depth convergent beam is set so that the beam waist thereof is positioned in the protrusion, wherein the position of the beam waist is set to a level in the protrusion above a position where the protrusion is to be cut by about the processing focal depth, and wherein the position where the protrusion is to be cut is at a distance from the color filter substrate not greater than a height of the spacer.

* * * * *